United States Patent [19]
Yoshida

[11] Patent Number: 5,642,180
[45] Date of Patent: Jun. 24, 1997

[54] PHOTOGRAPHIC CAMERA WITH INFORMATION READING FUNCTION

[75] Inventor: Yutaka Yoshida, Saitama-ken, Japan

[73] Assignees: Fuji Photo Optical Co., Ltd., Saitama-ken; Fuji Photo Film Co., Ltd., Kanagawa-ken, both of Japan

[21] Appl. No.: 604,717

[22] Filed: Feb. 21, 1996

[30] Foreign Application Priority Data

Feb. 22, 1995 [JP] Japan .................................. 7-033762

[51] Int. Cl.⁶ .................................................. G03B 7/00
[52] U.S. Cl. ............................................................ 396/207
[58] Field of Search ............................ 354/21, 75, 76

[56] References Cited

U.S. PATENT DOCUMENTS 5,440,363  8/1995  Minnick et al. ......................... 354/21

FOREIGN PATENT DOCUMENTS 4233910  3/1994  Japan .
5150577  1/1995  Japan .

*Primary Examiner*—Howard B. Blankenship
*Attorney, Agent, or Firm*—Sixbey, Friedman, Leedom & Ferguson, P.C.; Gerald J. Ferguson, Jr.

[57] ABSTRACT

In a photographic camera with information reading function, a bar code sensor having a light projecting portion and a light receiving portion is provided in a magazine chamber in which a film magazine having a bar code plate bearing thereon information on the film is loaded. Information on the film is read by the bar code sensor on the basis of reflected light from the bar code plate while camera control information is read also by the bar code sensor on the basis of light projected from a light projecting portion of an information input system opposed to the light receiving portion of the bar code sensor. The arrangement of a signal processing circuit of the light receiving portion of the bar code sensor for processing signals obtained from light received by the light receiving portion is switched according to which of the information on the film and the camera control information is to be read so that the signal processing circuit is adapted to the signal to be processed.

5 Claims, 12 Drawing Sheets

F I G. 5
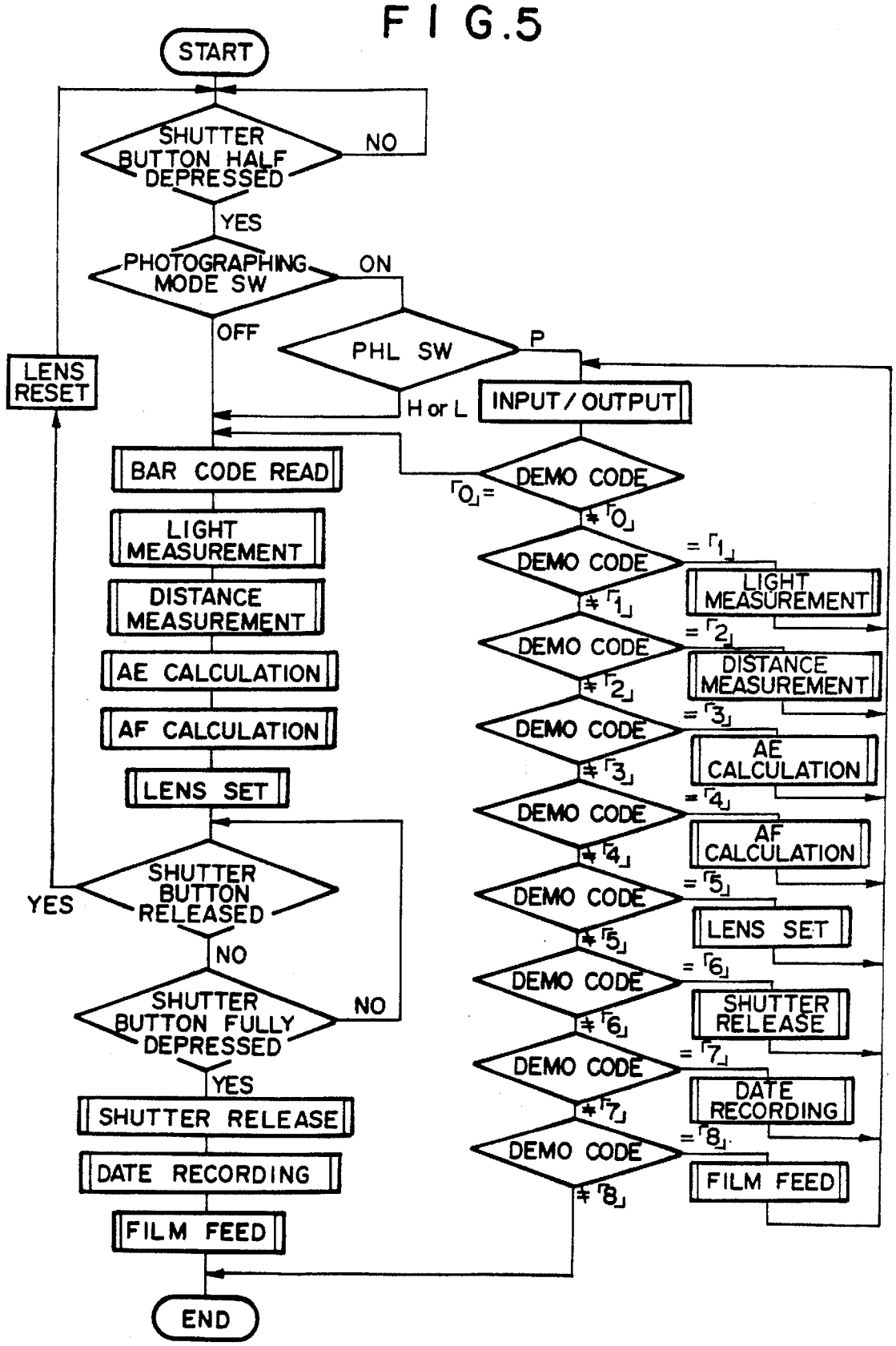

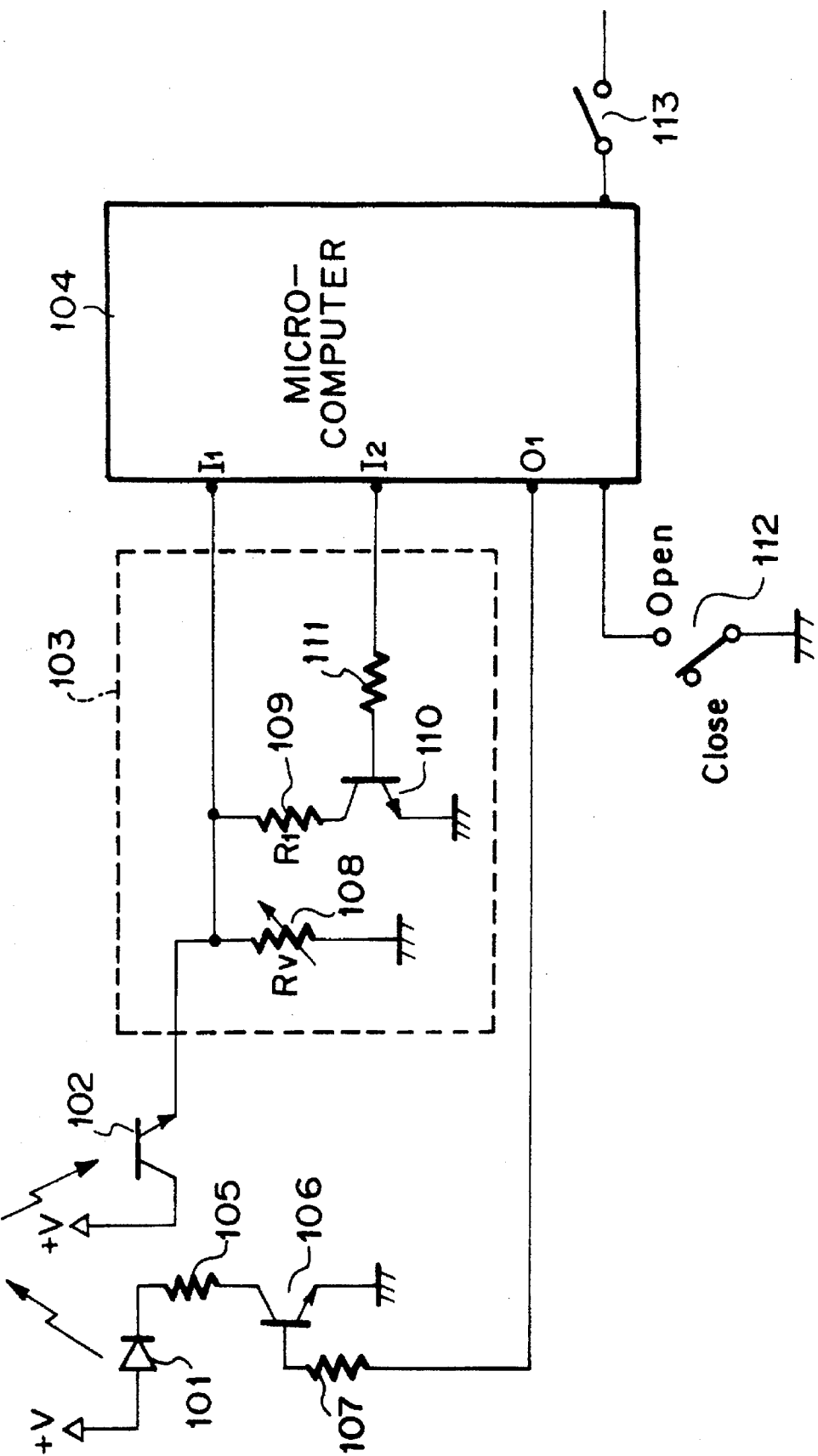
F I G. 7

PHOTOGRAPHIC CAMERA WITH INFORMATION READING FUNCTION

BACKGROUND OF THE INVENTION

1. Field of the Invention

This invention relates to a photographic camera with information reading function into which camera control information can be input from an information input system, and more particularly to a photographic camera which reads the camera control information with a bar code sensor for reading information on film from a bar code plate on a film magazine.

2. Description of the Related Art

There has been known a film magazine in which a data disk carrying thereon bar codes representing information inherent to the film magazine such as the ISO sensitivity, the number of exposure frames and the like of the film is provided to rotate integrally with the spool. The bar codes comprise a plurality of bars of a low reflectivity and spaces of a high reflectivity which are alternately arranged in the direction of rotation of the data disk. Further a particular portion such as a black quiet zone showing a data read begin position or a data read end position is provided at the leading end and/or the trailing end of the bar codes.

Further there has been known a photographic camera in which a film magazine provided with such a data disk is loaded as disclosed, for instance, in U.S. Pat. No. 5,025,274. The camera disclosed in the United States patent is provided with a photosensor for reading the bar codes, and the bar codes are read by the photosensor while the film magazine is loaded in the camera and the first frame of the film is set to the film aperture of the camera. The camera automatically adjusts various mechanisms in the camera such as the stop on the basis of the data read by the photosensor.

Further there has been known a photographic camera in which correction of output of a light measuring system, intensity of flash, battery check level, properties of lens barrel and the like are stored in a ROM and a microcomputer in the camera performs a sequence of operation referring to the ROM. Recently in some cameras, a nonvolatile storage such as an EEPROM (Electrically Erasable & Programmable ROM) is employed in place of a ROM, which is not reloadable, so that such camera control information can be checked and corrected after assembly of the camera.

In a photographic camera wherein the EEPROM is employed, an exclusive electric terminal must be provided to connect the EEPROM to an external instrument for writing information or read information from the EEPROM. It is necessary that the electric terminal is not accessible to a common user but permits connection with an external instrument in case of necessity. Accordingly the mechanism for exposing the terminal is inherently complicated.

So we have proposed a photographic camera with information reading function in which a reflective photosensor is provided in a magazine chamber in which a film magazine having a bar code plate rotated integrally with the film spool is loaded and information on the film is read by the photosensor on the basis of reflected light from the bar code plate while camera control information is read also by the photosensor on the basis of light projected from a light projecting portion of an information input system opposed to the photosensor. See Japanese Patent Application Nos. 4(1992)-233910 and 5(1993)-150577.

When the camera control information is read by the reflective photosensor for reading the film information, the sensor-occupied space can be saved and the manufacturing cost of the camera can be lowered.

Since the reflective photosensor receives reflected light from the bar code plate which is relatively weak, the photoelectric convertor circuit of the photosensor must have a certain amplification factor.

On the other hand, when the photosensor directly receives the light from the light projecting portion of the information input system, the amplification factor of the photoelectric convertor circuit need not be so large.

Further, since the rotational speed of the bar code plate is not so high and the density of the bar codes on the bar code plate is not so high, change in the signal is relatively gentle when the information born by the bar code is to be read, and accordingly response speed of the photoelectric convertor circuit need not be so high.

On the other hand, when the information from the information input system is to be read, hundreds to thousands Bauds of response speed of the photoelectric convertor circuit is generally required.

Accordingly it is preferred that the arrangement of the circuit for photoelectric conversion of the information signal read by the reflective photosensor be changed according to the information to be read.

SUMMARY OF THE INVENTION

In view of the foregoing observations and description, the primary object of the present invention is to provide a photographic camera with information reading function in which the signal bearing thereon information read by the bar code sensor from the bar code plate and the signal bearing thereon information input through the bar code sensor both can be well processed.

In a photographic camera in which a bar code sensor comprising a light projecting portion and a light receiving portion is provided in a magazine chamber in which a film magazine having a bar code plate bearing thereon information on the film is loaded and information on the film is read by the bar code sensor on the basis of reflected light from the bar code plate while camera control information is read also by the bar code sensor on the basis of light projected from a light projecting portion of an information input system opposed to the light receiving portion of the bar code sensor, the photographic camera with information reading function in accordance with the present invention is characterized by having a circuit switching means which switches the arrangement of a signal processing circuit of the light receiving portion of the bar code sensor for processing signals obtained from light received by the light receiving portion according to which of the information on the film and the camera control information is to be read so that the signal processing circuit is adapted to the signal to be processed.

For example, the circuit switching means may switch the arrangement of the signal processing circuit so that the amplification factor of the signal and/or the response speed to the signal is changed.

The light receiving portion of the bar code sensor may comprise a phototransistor and in this case the circuit switching means may change the impedance of an element connected to an emitter or a collector of the phototransistor according to the signal to be read.

Thus in accordance with the present invention, by switching the arrangement of the signal processing circuit of the light receiving portion of the bar code sensor according to which of the information on the film and the camera control information is to be read, the signal processing circuit is adapted to the signal to be processed and each of the signals respectively bearing thereon the film information and the camera control information can be properly processed even if the information signals are read by a bar code sensor.

Since the two information signals are largely different from each other in the input level and the input speed, it is preferred that the signal amplification factor and/or the response to the signal of the signal processing circuit be switched according to the information signal to be read.

Further when the light receiving portion of the bar code sensor comprises a phototransistor and the circuit switching means changes the impedance of an element connected to an emitter or a collector of the phototransistor according to the signal to be read, the circuit switching means may be simple in structure.

BRIEF DESCRIPTION OF THE DRAWINGS

FIG. 5 is a flow chart for illustrating the sequence program executed by the microcomputer, FIG. 7 is a circuit diagram of an example of the photoelectric conversion circuit.

DESCRIPTION OF THE PREFERRED EMBODIMENT

Figure 1:
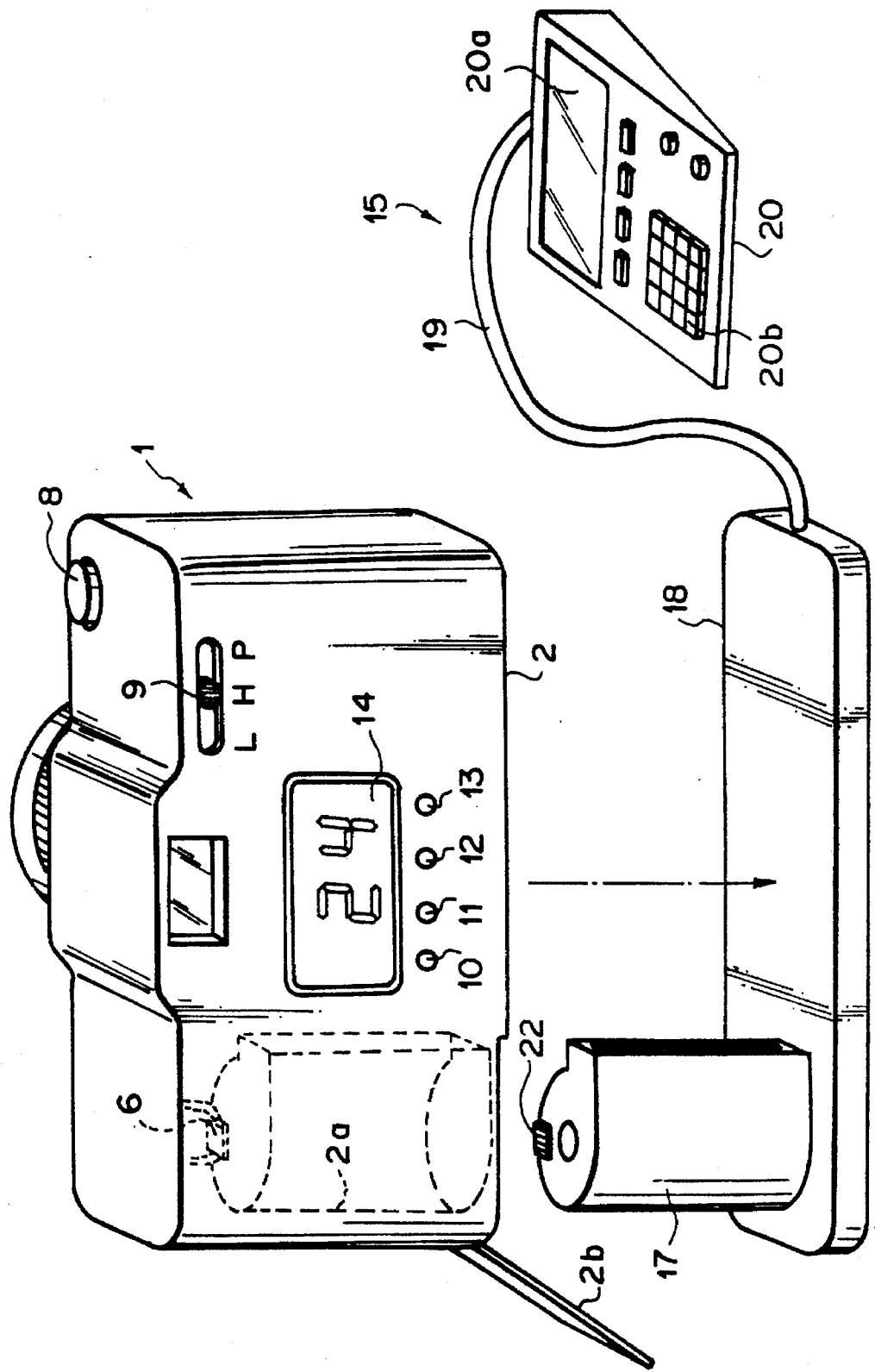
FIG. 1 is a schematic perspective view showing a photographic camera in accordance with an embodiment of the present invention together with an information input system.
Figure 2:
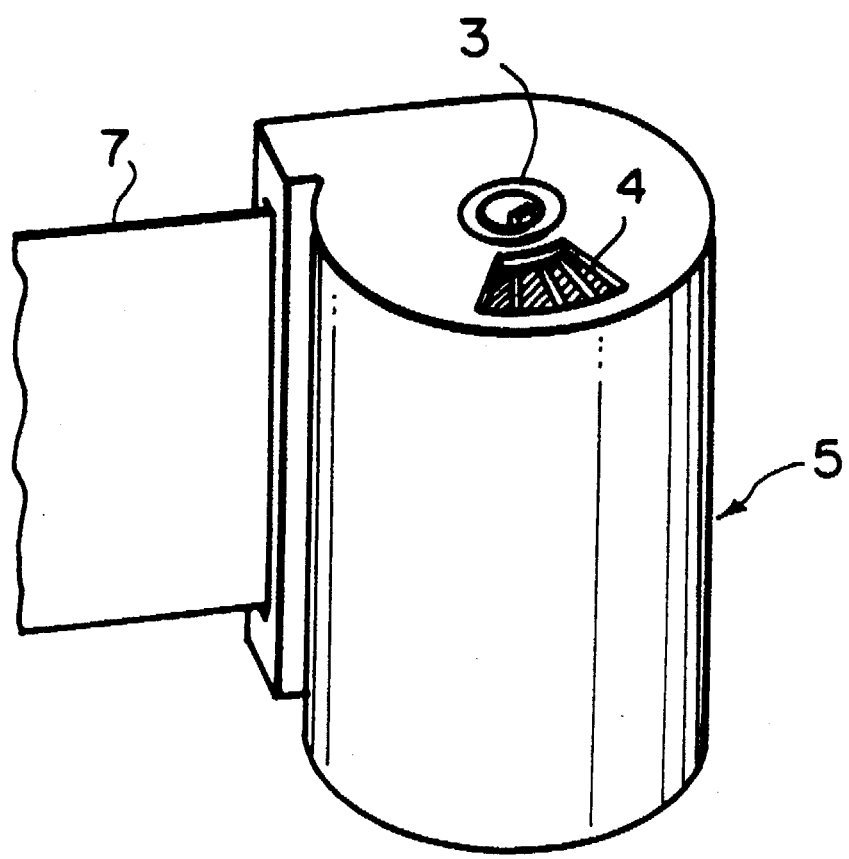
FIG. 2 is a perspective view showing a film magazine having bar codes rotated integrally with the film spool.

In FIGS. 1 and 2, a film magazine 5 having bar code plate 4 rotated integrally with a spool 3 is loaded in a camera 1. A reflective photosensor 6 is disposed in a magazine chamber 2a formed in a camera body 2 and reads information inherent to film 7 such as the ISO sensitivity, latitude, the number of exposure frames and the like of the film 7 from the bar code plate 4. The reflective photosensor 6 comprises a light emission diode (LED) and a phototransistor. As will be described later, the reflective photosensor 6 is also used when changing the data stored in an EEPROM built-in the camera body 2. The film magazine 5 is loaded in so-called a drop-in-load fashion from the bottom of the camera body 2. The camera body 2 is provided with a back lid 2b which closes and opens the magazine chamber 2a.

A shutter release button 8 is disposed on the top of the camera body 2. A frame size change switch 9 which changes the frame size among a full size L (aspect ratio of b 1.46). a wide size H (aspect ratio of 1.78) and a panoramic size P (aspect ration of 2.86), a photographing mode switch (test mode switch) 10 for setting a photographing mode such as daylight synchronization mode of a strobe light, a self-timer switch 11, a date set switch 12, a date mode switch 13 and a liquid crystal panel 14 for displaying the date, capacity of the cell, film count and the like are disposed on the rear face of the camera body 2.

In FIG. 1, an information input system 15 comprises an insertion portion 17 which is equal to the film magazine 5 in shape and is adapted to be inserted into the magazine chamber 2a of the camera body 2, a base portion 18 and a body portion 20 connected to the base portion 18 by a cable 19. The body portion 20 comprises a monitor screen 20a and a keyboard 20b for inputting information. A reflective photosensor 22 similar to the reflective photosensor 6 is mounted on the top of the insertion portion 17 in a position where the LED of the photosensor 22 is opposed to the phototransistor of the photosensor 6 and the phototransistor of the photosensor 22 is opposed to the LED of the photosensor 6 when the insertion portion 17 is inserted into the magazine chamber 2a.

Figure 3:
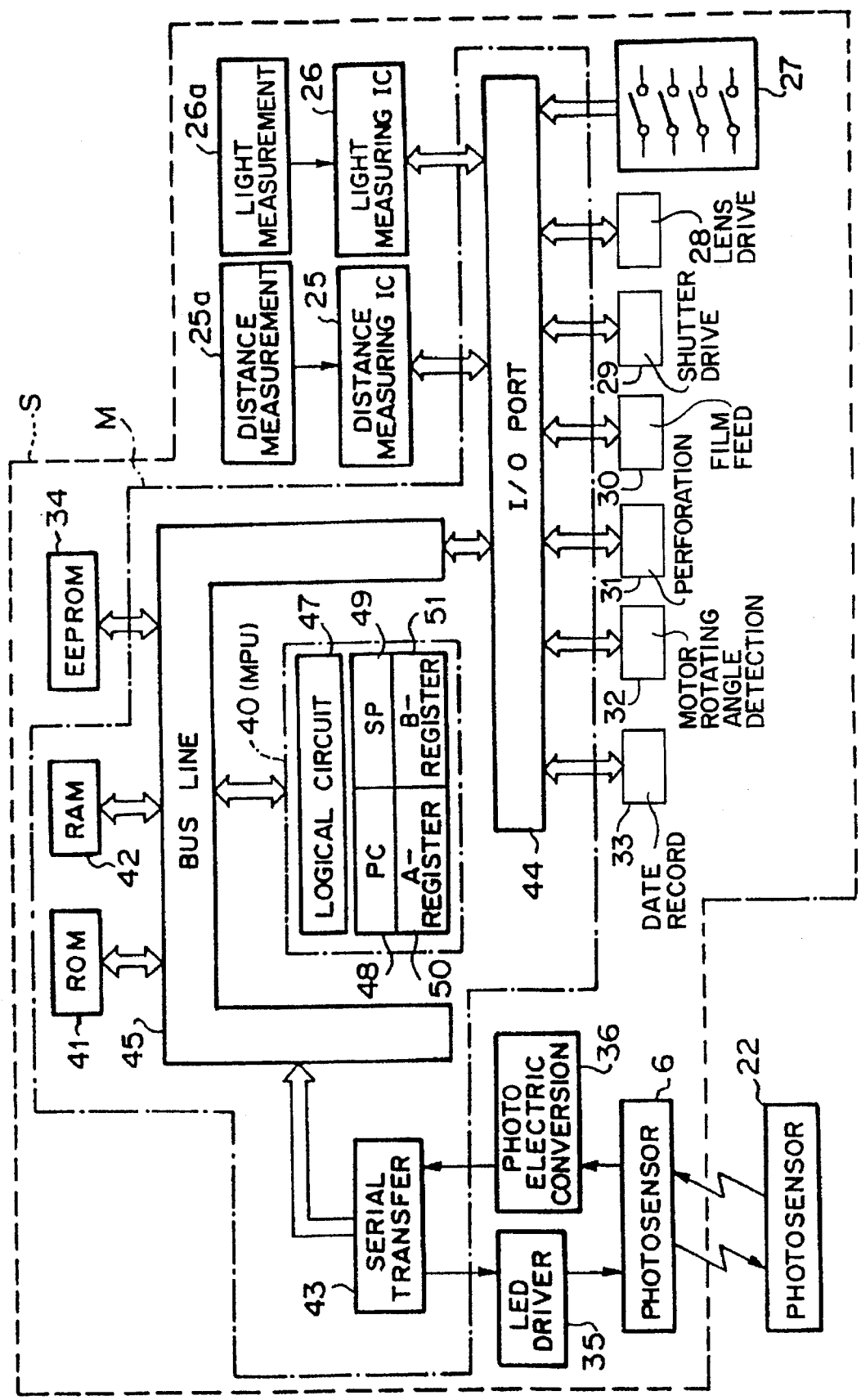
FIG. 3 is a block diagram of the electric circuit of the camera.

A circuit block S surrounded by the broken line in FIG. 3 is built in the camera body 2. The circuit block S comprises a one-chip microcomputer M, a distance measuring IC 25, a light measuring IC 26, a plurality of switches (including photographing mode switch and back lid switch to be described later) 27, a lens drive system 28, a shutter drive system 29, a film feed system 30 a perforation detecting system 31, a motor rotating angle detecting system 32, a date recording system 33, an EEPROM 34, an LED driver 35, a photoelectric conversion circuit 36 and the reflective photosensor 6.

The microcomputer M comprises a micro processor unit (MPU) 40, a ROM 41, a RAM 42, a serial transfer system 43, an I/0 port 44 and a bus line 45 for data transfer and addressing which are united into a chip. The MPU 40 comprises a logical circuit 47 for operation and control, a program counter 48, a stack pointer 49, registers such as an A-register 50 and a B-register 51, a clock generator (not shown) and the like.

Figure 4:
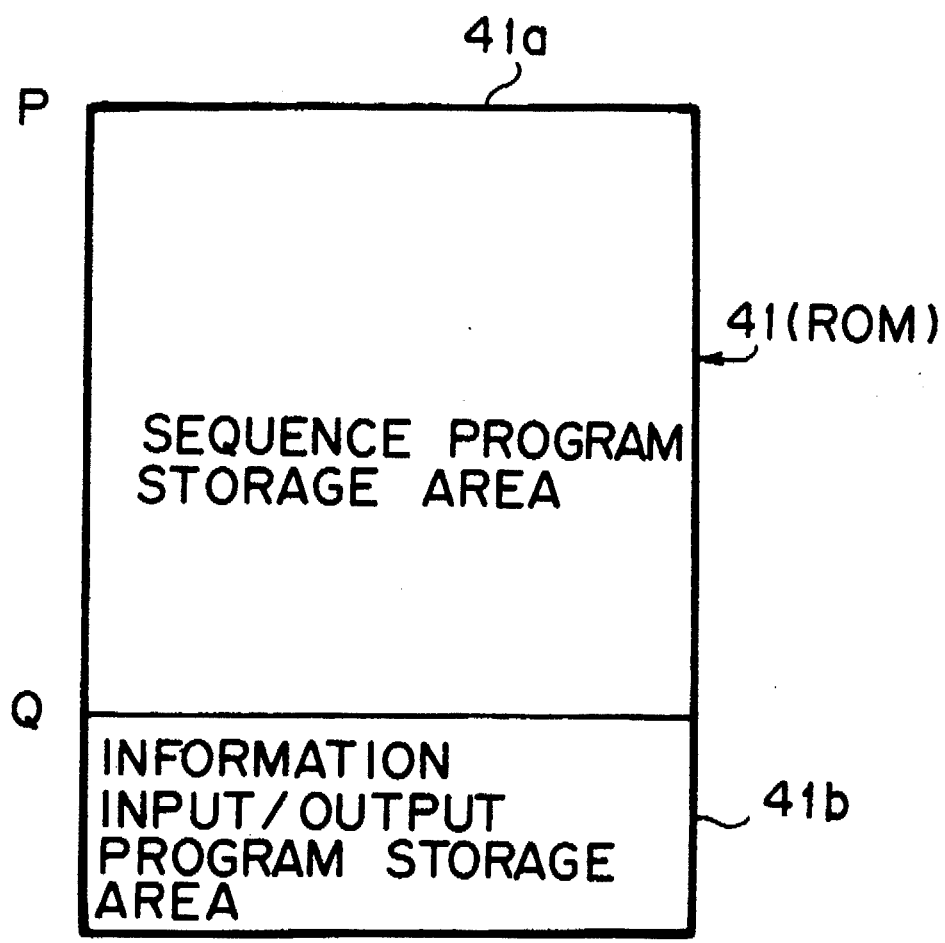
FIG. 4 is a schematic view for illustrating the ROM.

As shown in FIG. 4, the ROM 41 comprises a sequence program storage area 41a (starting at address P) in which a sequence program for executing a photographing sequence and an information input/output program (including a test program) storage area 41b (starting at address Q). In order to make it possible to debug the sequence program, an EEPROM may be employed as the ROM 41. The RAM 42 is used as a work area for temporarily storing various data and addresses when the sequence program in the ROM 41 is executed and as a stack area for temporarily saving data in the registers of the microcomputer M. The distance measuring IC 25 and the light measuring IC 26 respectively control a distance measuring system 25a and a light measuring system 26a in response to a command from the MPU 40 and actuate the I/O port 44 according to the distance data and the light data obtained, thereby controlling the lens drive system 28 and the shutter drive system 29. In order to realize serial transfer of transmitted data and received data, the serial transfer system 43 includes an error checking and correction function and a resending function which are performed verifying the data transmitted and received, an anti-collision function for preventing both-way simultaneous transmission and a handshaking function for preventing transmission when the other does not receive. The information input system 15 is provided with the same serial transfer system.

The I/O port 44 transfers data according to addressing from the MPU 40 between the MPU 40 and each of the distance measuring IC 25, the light measuring IC 26, the switches 27, the lens drive system 28, the shutter drive system 29, the film feed system 30, the perforation detecting system 31, the motor rotating angle detecting system 32 and the date recording system 33.

The normal photographing sequence of the camera of this embodiment is performed in the manner shown in the flow chart of FIG. 5 according to the sequence program stored in the sequence program storage area 41a of the ROM 41. When the shutter release button 8 is depressed halfway after a film magazine 5 is loaded in a magazine chamber 2a, predetermined switches in the switch group 27 is turned on. When the signal representing that the predetermined switches are on is input into the MPU 40, the MPU 40 checks whether the photographing mode switch 10 is on and at the same time the frame size change switch 9 is pointing P. Normally the photographing mode switch 10 is off.

When the photographing mode switch 10 is off, the photographing sequence program stored in the ROM 41 is performed. At this time, the microcomputer M directly turns on and off the LED of the reflective photosensor 6 and reads the value of the photoelectric conversion circuit 36 by virtue of the serial transfer system 43. Then the spool 3 is rotated to feed out the film 7, whereby the film leader is fed out of the film magazine 5 and comes to be taken by the film take-up spool of the camera. While feeding the film 7 in this manner, the bar code plate 4 is rotated and the film information born by the bar code plate 4 is read by the reflective photosensor 6, whereby data on the film 7 such as the sensitivity, the latitude the number of exposures and the like are stored in a predetermined address area in the RAM 42. Thereafter, the MPU 40 outputs a light data sampling command and a distance data sampling command to the light measuring IC 26 and the distance measuring IC 25 in sequence. The light data and the distance data are stored in a predetermined address area in the RAM 42 and then the MPU 40 executes calculation for automatic exposure control (will be referred to as "AE calculation", hereinbelow) and calculation for automatic focusing control (will be referred to as "AF calculation", hereinbelow) on the basis of these data.

In the AE calculation, the MPU 40 calculates a proper exposure on the basis of the light data obtained in the manner described above as well as the data on the sensitivity of the film 7 and the like which have been stored in the RAM 42 and calculates the opening time of the program shutter so that the proper exposure is obtained. The data on the shutter opening time thus obtained are stored in another address area in the RAM 42. In the AF calculation, the MPU 40 calculates the object distance on the basis of the distance data from the distance measuring IC 25 and calculates an optimal focusing position of the taking lens system on the basis of the object distance. The data on the optimal focusing position are also stored in another address area in the RAM 42.

After completion of these calculations, the MPU 40 operates the lens drive system 28 according to the optimal focusing position data stored in the RAM 42 to move the lens system to the optimal focusing position. After the taking lens system is moved to the optimal focusing position, a signal representing that the taking lens system is in the optimal focusing position is fed back to the MPU 40 and the MPU 40 comes to permit the shutter release button 8 to be fully depressed.

When the shutter release button 8 is fully depressed, the MPU 40 operates the shutter drive system 29 on the basis of the shutter opening time data stored in the RAM 42 to open and close the shutter, whereby the film 7 is exposed to light. When a signal representing that the shutter has been opened and closed is fed back to the MPU 40 as a signal representing that a predetermined one of the switches 27 is closed, the date recording system 33 exposes the exposed frame to light representing the date, thereby recording the date on the exposed frame.

After recording the date, the MPU 40 outputs a starting signal to the film feed system 30, whereby film feed is started and a photoelectric switch in the switch group 27 outputs a pulse signal each time a perforation passes. When the number of the pulse signals reaches 8, the MPU 40 outputs a stop signal to the film feed system 30. In this manner, the film 7 is fed by one frame length and one photographing sequence is completed. Necessary control values are read out from the EEPROM 34 during the operation described above.

In the sequence program for executing the photographing sequence, the processes, "light measurement", "distance measurement", "AE calculation" and so on, are performed in subroutines. An information input/output program for performing the subroutines independently from each other is stored in the information input/output program storage area 41b. The information input/output program is only activated when the photographing mode switch 10 is on, the frame size change switch 9 is pointing P and at the same time the shutter release button 8 is depressed halfway. Thus the information input/output program cannot be accidentally activated by a user.

When one of the subroutines is to be selectively performed, the information input system 15 is used. That is, the back lid 2b of the magazine chamber 2a is opened and the insertion portion 17 is inserted into the magazine chamber 2a until the bottom of the camera body 2 is brought into contact with the base portion 18 of the information input system 15, whereby the reflective photosensor 22 on the top of the insertion portion 17 is positioned opposed to the reflective photosensor 6 in the magazine chamber 2a. Before activating the test program in the information input/output program, a demonstration code is keyed from the information input system 15 and is output from the light protecting portion of the reflective photosensor 22 as a light signal. The light signal is received by the light receiving portion of the reflective photosensor 6 in the camera body 2 and is converted to an electric signal by the photoelectric conversion circuit 36. The electric signal is then input into the microcomputer M. Thus one of demonstration code [1]to demonstration code [8]is set at a predetermined address in the RAM 42, whereby a subroutine to be demonstrated is selected. At this time, data parameters necessary for the subroutine, for instance, a shutter speed, a lens opening and the like in the case of shutter drive, are set in corresponding address areas. After the designated subroutine is performed, information input/output processing is performed again. Further a parameter on the lens moving system (lens barrel) of the particular camera is also keyed from the information input system 15 and is set in the address area described above.

The information signals input through the light receiving portion of the reflective photosensor 6 include the information signal from the bar code plate 4 and that from the information input system 15. Those information signals differ from each other in that the former signal is reflective light which is reflected from the bar code plate 4 and bears thereon bar code information while the latter signal is directly input from the reflective photosensor 22 of the information input system 15 and bears thereon various information. Accordingly the amplification factor and the response speed of the photoelectric conversion circuit 36 must be changed according to which of the information signals is input.

In the camera of this embodiment, the amplification factor of the photoelectric conversion circuit 36 is increased and the response speed is reduced when the information signal from the bar code plate 4 is input and the amplification factor is reduced and the response speed is increased.

Figure 6:
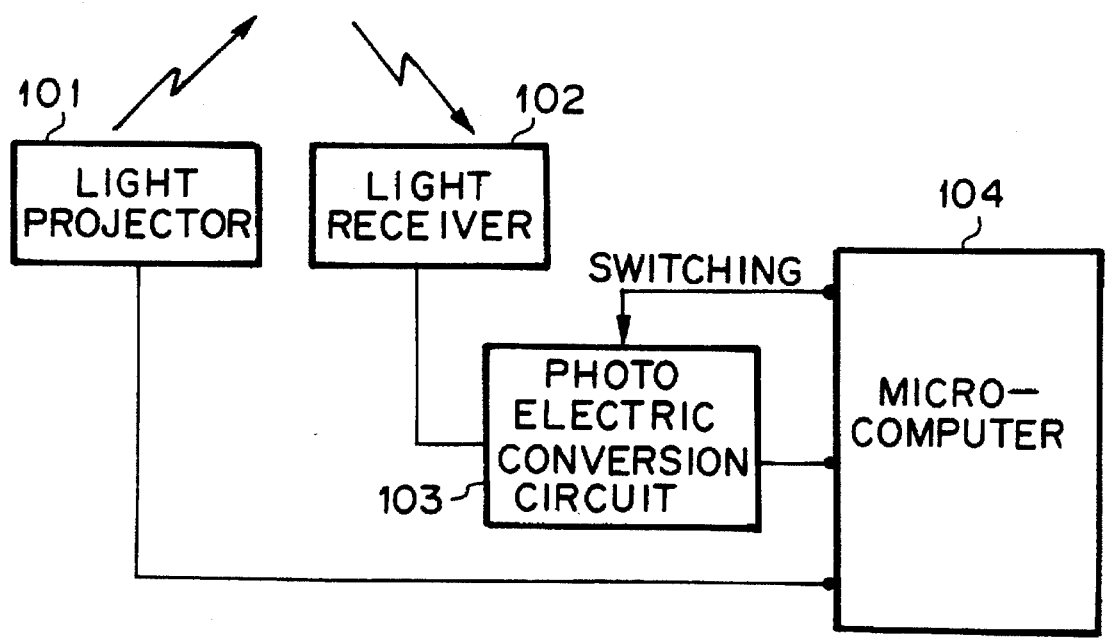
FIG. 6 is a block diagram for briefly illustrating the feature of the camera of the present invention.

This is schematically shown in FIG. 6. That is, the reflective photosensor 6 has a light projector 101 and a light receiver 102 and the light signal input into the light receiver 102 is converted to an electric voltage signal by a photoelectric conversion circuit 103 and read by a microcomputer 104.

The amplification factor and the response speed of the photoelectric conversion circuit 103 are changed under the control of a switching signal from the microcomputer 104 according the kind of the signal input.

An example of the photoelectric conversion circuit 103 is shown in FIG. 7. In FIG. 7, the photoelectric conversion circuit 103 comprises a variable resistor 108 and a fixed resistor 109, a NPN transistor 110 and a base resistor 111 for the transistor 110 which are connected in parallel to the variable resistor 108.

The back lid switch 112 and the test mode switch (the photographing mode switch) 113 are connected to the microcomputer 104 as described above. The light projector 101 is connected to the microcomputer 104 by way of a resistor 105, a NPN transistor 106 and a base resistor 107 for the transistor 106 and projects light onto the bar code plate 4 upon receipt of a predetermined signal from the microcomputer 104.

When the microcomputer detects that the test mode switch 113 is on, the circuit is set to a state adapted to accepting the information signal from the information input system 15. That is, the voltage level of I2 terminal is set to H. When the voltage level of the I2 terminal is set to H, the NPN transistor 110 is turned on and the voltage level input into I1 terminal of the microcomputer 104 is as obtained by multiplying the photo current $i_0$ generated in the light receiver 102 by the combined resistance $R_vR_1/(R_v+R_1)$ of the variable resistor 108 and the fixed resistor 109.

On the other hand, when the microcomputer detects that the test mode switch 113 is off, the circuit is set to a state adapted to accepting the information signal from the bar code plate 4. That is, the voltage level of the I2 terminal is set to L. When the voltage level of the I2 terminal is set to L, the NPN transistor 110 is turned off and the voltage level input into the I1 terminal of the microcomputer 104 is as obtained by multiplying the photo current $i_0$ generated in the light receiver 102 by the resistance $R_v$ of the variable resistor 108.

For example, assuming that the resistance of the variable resistor 108 is 80KΩ and the resistance of the fixed resistor 109 is 5KΩ, the combined resistance is about 4.7KΩ when the test mode switch 113 is on while when the test mode switch 113 is off, the combined resistance is 80KΩ which is equal to the resistance of the variable resistor 108. Accordingly the amplification factor for the information signal from the bar code plate 4 is about 17 times as large as that for the information signal from the information input system 15.

At the same time, since discharge of charge accumulated in the base is suppressed as the resistance increases, the response speed is lowered as the amplification factor increases. Accordingly in this embodiment, the response speed to the information signal from the information input system 15 becomes higher than that to the information signal from the bar code plate 4.

Figure 8:
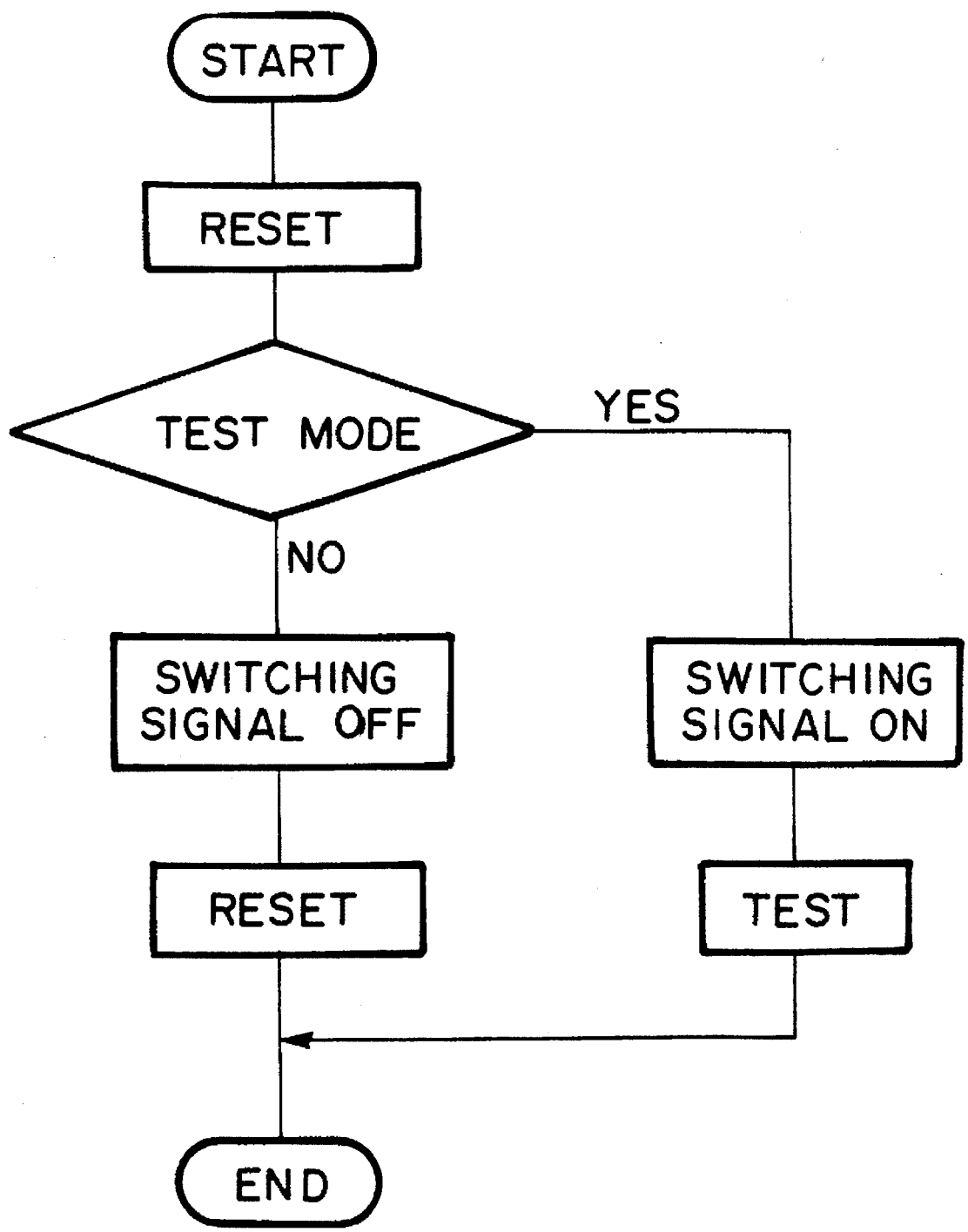
FIG. 8 is a flow chart for briefly illustrating the program to be performed by the microcomputer in the camera provided with the photoelectric conversion circuit shown in FIG. 7.

A simplified circuit switching program executed by the microcomputer 104 will be described with reference to the flow chart shown in FIG. 8, hereinbelow. After starting the program, the program is reset and initialized. Then it is determined whether the test mode is selected, i.e., whether the test mode switch 113 is on.

When it is determined that the test mode is selected, a switching signal is turned on to set the voltage level of the I2 terminal to H, whereby the amplification factor of the photoelectric conversion circuit 103 is reduced and the response speed of the same is increased. Thus the photoelectric conversion circuit 103 is set to a state adapted to accepting the information signal from the information input system 15.

On the other hand, when it is determined that the photographing mode is selected, a switching signal is turned off to set the voltage level of the I2 terminal to L, whereby the amplification factor of the photoelectric conversion circuit 103 is increased and the response speed of the same is lowered. Thus the photoelectric conversion circuit 103 is set to a state adapted to accepting the information signal from the bar code plate 4.

Figure 9:
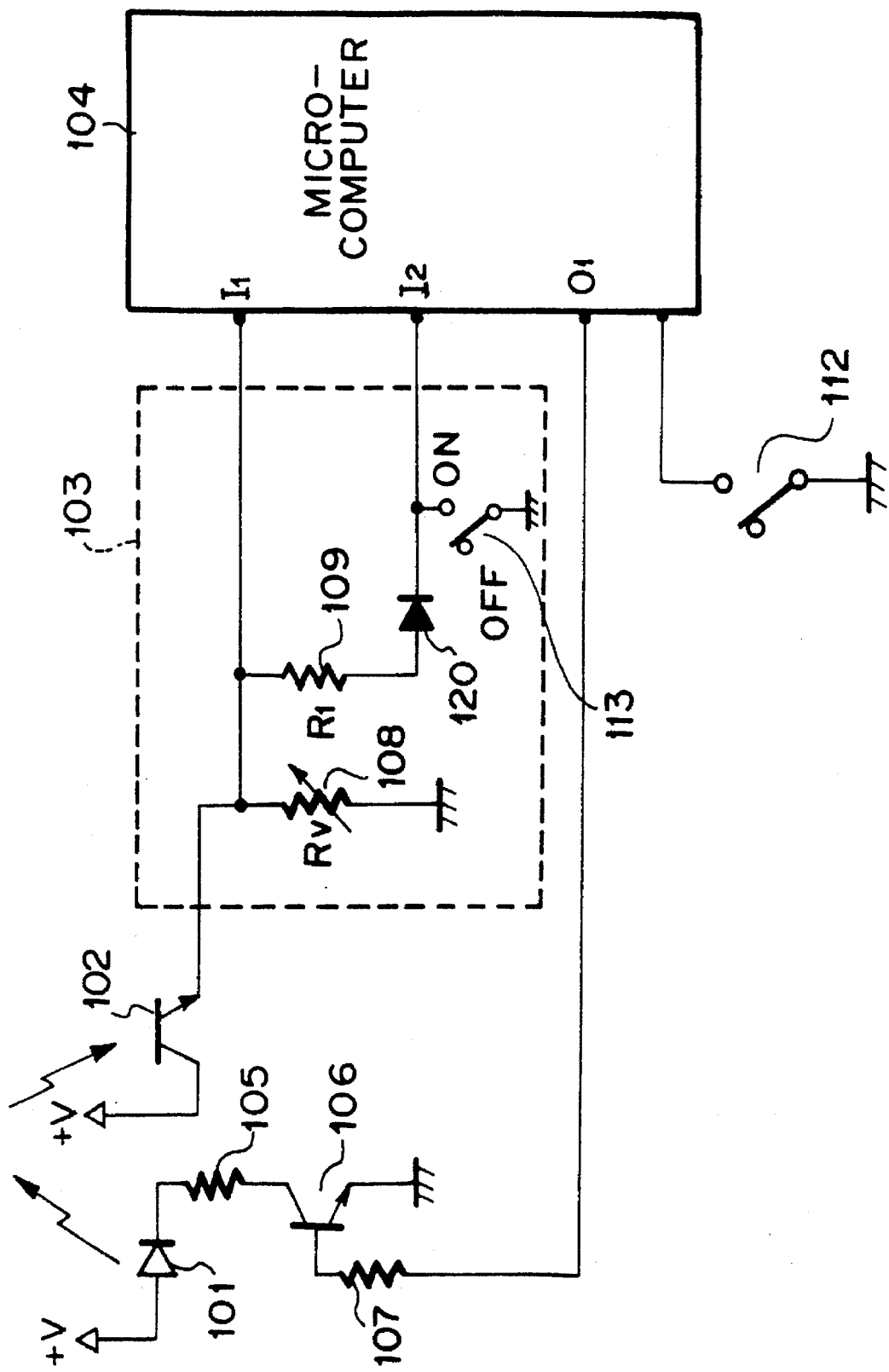
FIG. 9 is a circuit diagram of another example of the photoelectric conversion circuit.

Another example of the photoelectric conversion circuit 103 is shown in FIG. 9. In the example shown in FIG. 9, an electric current flows to the ground through a fixed resistor 109, a diode 120 and the test mode switch 113 when the test mode switch 113 is on. Accordingly the voltage level input into I1 terminal of the microcomputer 104 is as obtained by multiplying the photo current $i_0$ by the combined resistance $R_vR_1/(R_v+R_1)$ of the variable resistor 108 and the fixed resistor 109 like in the preceding example. When the test mode switch 113 is off, no current flows through the fixed resistor 109 and the voltage level input into the I1 terminal of the microcomputer 104 is as obtained by multiplying the photo current $i_0$ by the resistance $R_v$ of the variable resistor 108 like in the preceding example.

Though in the examples shown in FIGS. 7 and 9, the photoelectric conversion circuit is switched according to the state of the test mode switch 113, the circuit may be switched according to, in addition to the state of the test mode switch 113, other conditions such as the position of the frame size change switch 9, the state of depression of the shutter release button 8, the position of the back lid switch 112 (FIGS. 7 and 9) and the like so that the circuit is switched only when all the conditions set are satisfied, thereby ensuring safety of switching.

Figure 10:
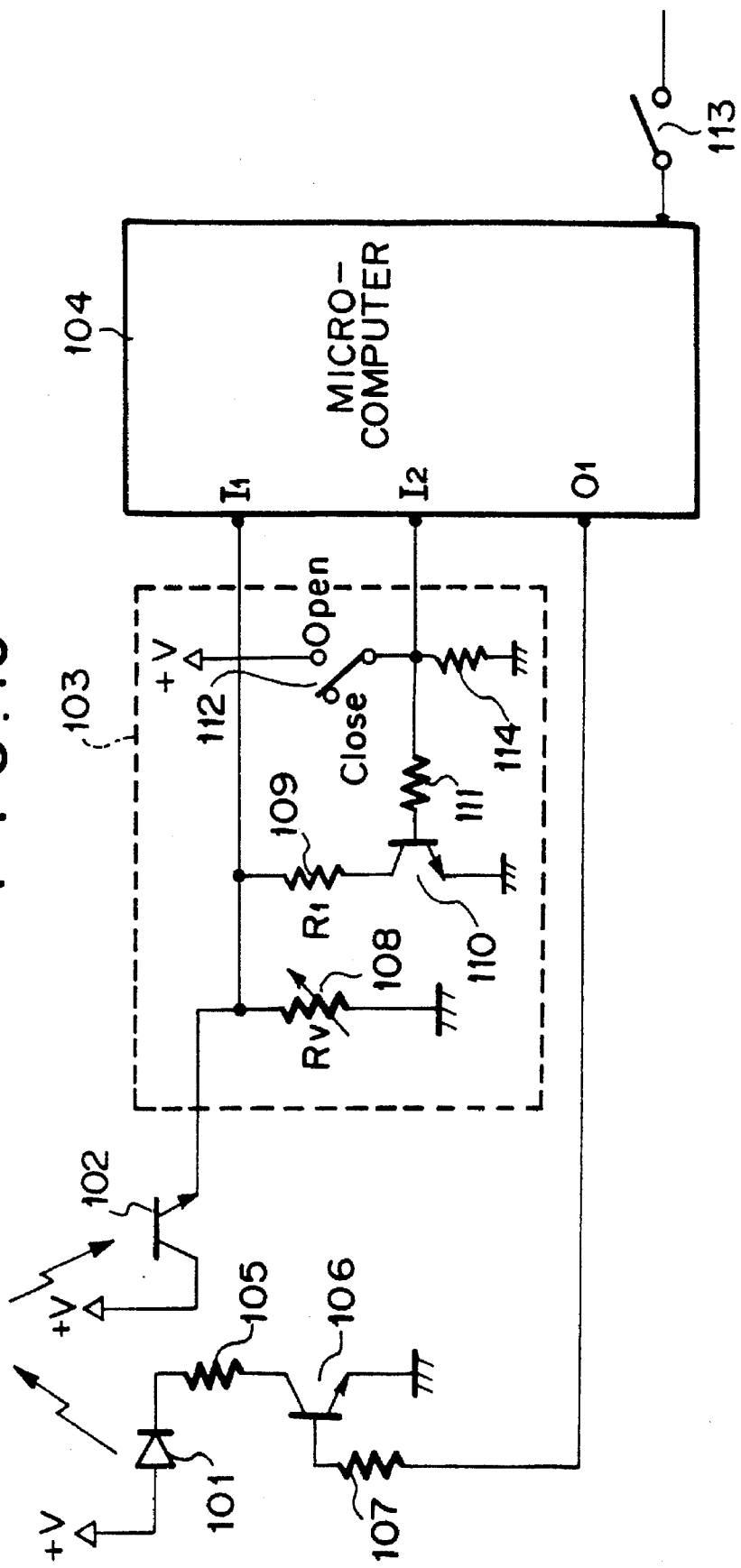
FIG. 10 is a circuit diagram of still another example of the photoelectric conversion circuit.
Figure 11:
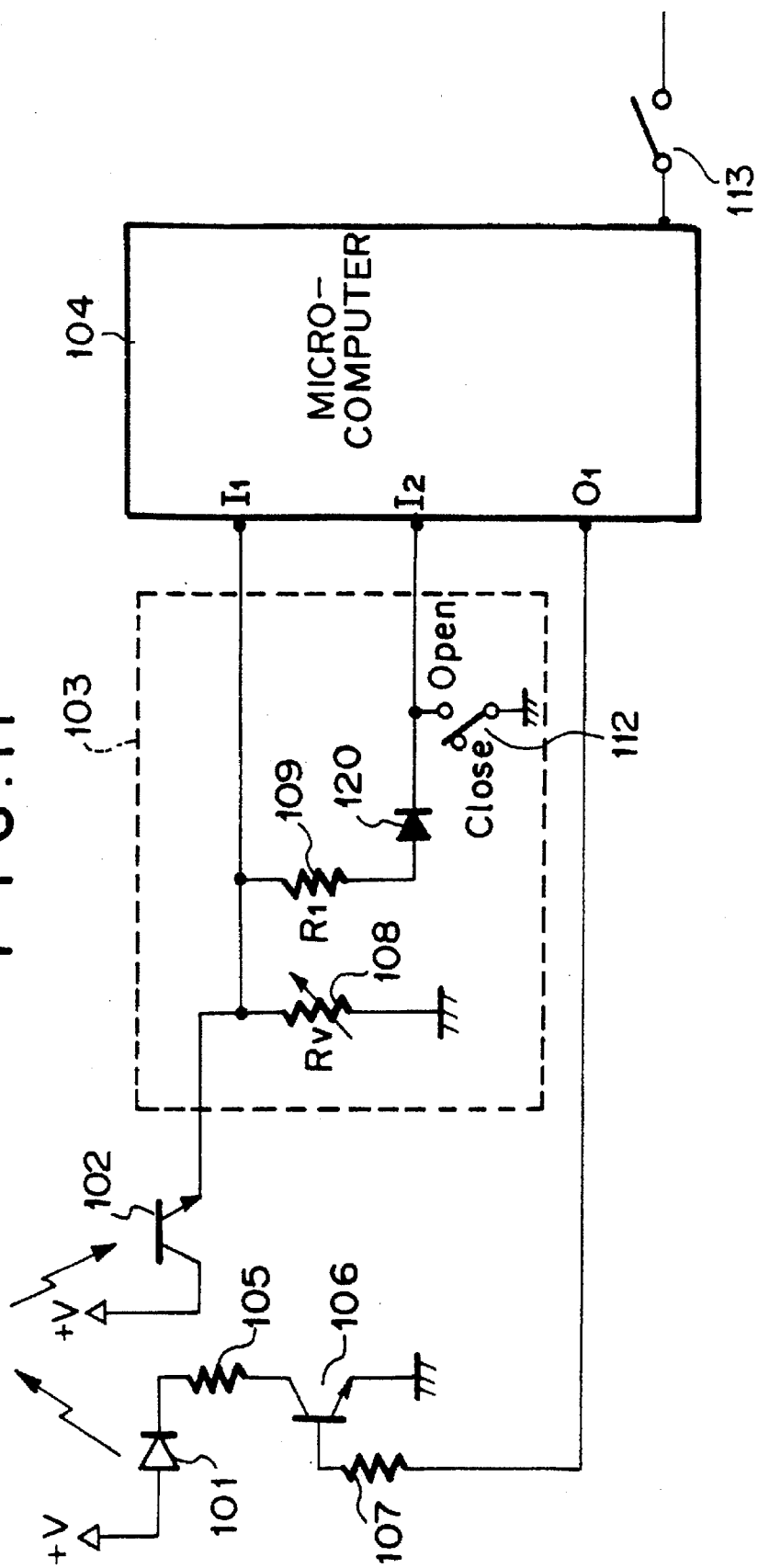
FIG. 11 is a circuit diagram of still another example of the photoelectric conversion circuit.

The combined resistance in the photoelectric conversion circuit 103 may be switched according to the state of the back lid switch 112 as in third and fourth examples shown in FIGS. 10 and 11, respectively. That is, when the testing is to be effected, the insertion portion 17 is inserted into the magazine chamber 2a and accordingly the back lid 2b is naturally kept open while when the information signal from the bar code plate 4 is to be read, the film magazine 5 is loaded in the magazine chamber 2a and accordingly the back lid 2b is naturally kept closed. Thus which signal is being read can be known from whether the back lid 2b is opened or closed.

It is possible to arrange the circuit so that the voltage level of the I2 terminal is set to H in response to opening of the back lid 2b (at which the back lid switch 112 is turned on) and to L in response to closure of the same (at which the back lid switch 112 is turned off).

Also in these examples, the circuit may be switched according to other conditions such as the position of the test mode switch 113 in addition to the state of the back lid switch 112.

Figure 12:
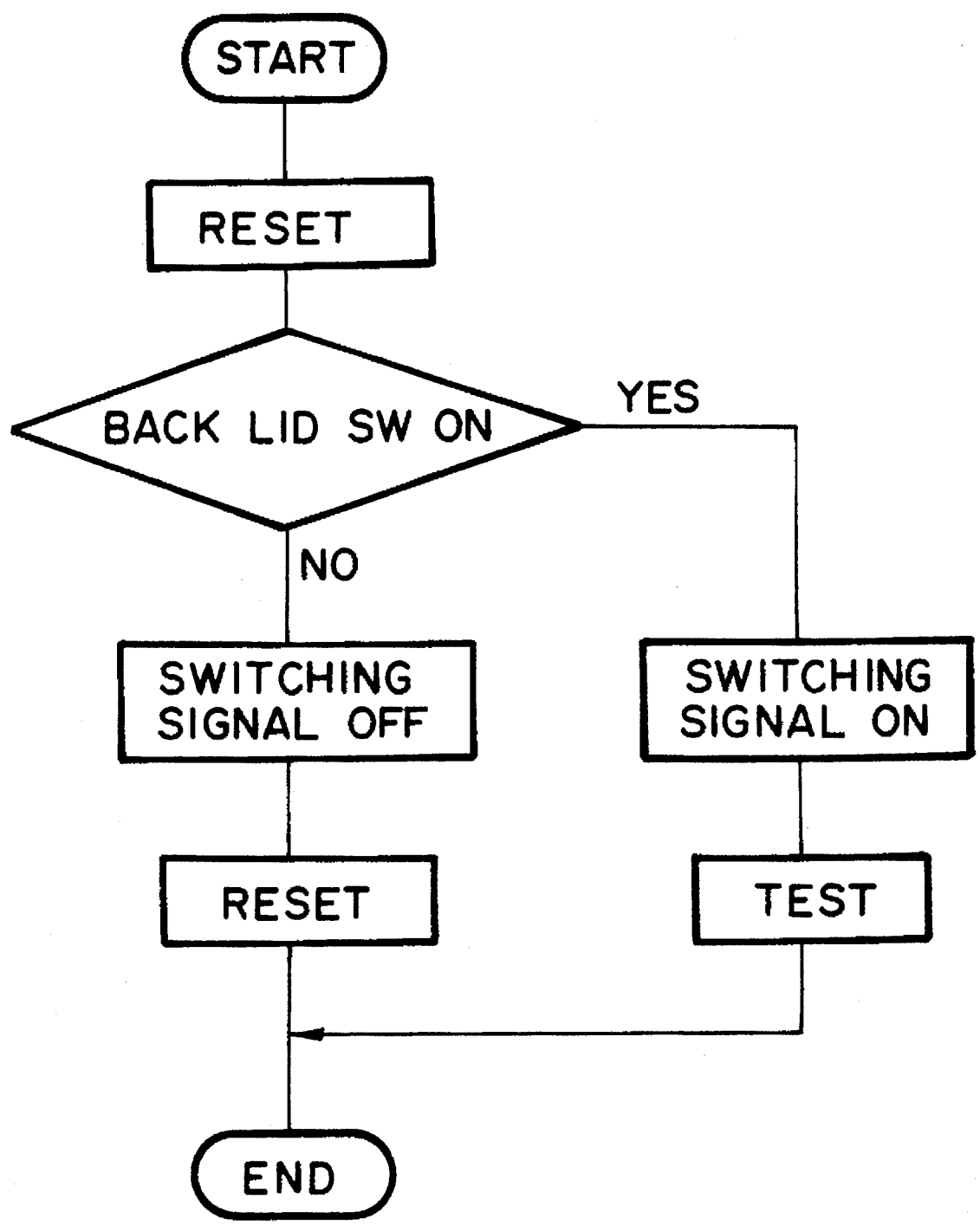
FIG. 12 is a flow chart for briefly illustrating the program to be performed by the microcomputer in the camera provided with the photoelectric conversion circuit shown in FIG. 10 or 11.

The switching program executed by the microcomputer 104 in the case of the third and fourth examples is as shown in FIG. 12. The flow chart shown in FIG. 12 is the same as the flow chart shown in FIG. 8 except that whether the back lid switch 112 is on is determined in place of whether the test mode is selected, The embodiment of the present invention described above may be variously modified.

For example, the signal processing circuit (the photoelectric conversion circuit) need not be limited to those described above but may be variously modified so long as it can be changed according to the kind of information input so as to properly process the signal.

Further, though in the embodiment described above, the photoelectric conversion circuit switching signal is generated by use of a microcomputer, a signal generating circuit of hardware may be employed in place of the microcomputer so long as it can generate the switching signal at a proper timing.

Though in the embodiment described above, the insertion portion 17 is the same as the film magazine 5 in shape, the insertion portion 17 may be smaller than the film magazine 5 so long as the LED and the phototransistor of the photosensor 22 on the top of the insertion portion 17 are respectively opposed to the phototransistor and the LED of the photosensor 6 in the magazine chamber 2a when the insertion portion 17 is inserted into the magazine chamber 2a. Further though in the embodiment described above, the camera is set to the test mode when the shutter release button is depressed halfway with the photographing mode switch on and the frame size change switch pointing P, the camera may be arranged to be set to the test mode when the phototransistor of the camera side photosensor detects blinking light from an external LED. Though in the embodiment described above, a reflective photosensor in which a light projector and a light receiver are in unit is employed, the light projector and the light receiver may be separately provided.

In the embodiment described above, the present invention is applied to a camera which has information signal reading function as well as information writing function. However the present invention can be applied to a camera having information signal reading function only.

Further, though in the embodiment described above, the arrangement of the circuit is switched by switching the impedance of an element connected to the emitter of the phototransistor, the arrangement of the circuit may be switched by connecting the element whose impedance is switched to the collector of the phototransistor.

What is claimed is:

1. A photographic camera with information reading function in which a bar code sensor comprising a light projecting portion and a light receiving portion is provided in a magazine chamber in which a film magazine having a bar code plate bearing thereon information on the film is loaded and information on the film is read by the bar code sensor on the basis of reflected light from the bar code plate while camera control information is read also by the bar code sensor on the basis of light projected from a light projecting portion of an information input system opposed to the light receiving portion of the bar code sensor, wherein the improvement comprises a circuit switching means which switches the arrangement of a signal processing circuit of the light receiving portion of the bar code sensor for processing signals obtained from light received by the light receiving portion according to which of the information on the film and the camera control information is to be read so that the signal processing circuit is adapted to the signal to be processed.

2. A photographic camera as defined in claim 1 in which the circuit switching means switches the arrangement of the signal processing circuit so that the amplification factor of the signal is changed.

3. A photographic camera as defined in claim 2 in which the circuit switching means switches the arrangement of the signal processing circuit so that the response speed to the signal is changed.

4. A photographic camera as defined in claim 1 in which the circuit switching means switches the arrangement of the signal processing circuit so that the response speed to the signal is changed.

5. A photographic camera as defined in any one of claims 1 to 4 in which the light receiving portion of the bar code sensor comprises a phototransistor and the circuit switching means changes the impedance of an element connected to an emitter or a collector of the phototransistor according to the signal to be read.

* * * * *